(12) United States Patent
Kawai et al.

(10) Patent No.: US 12,330,624 B2
(45) Date of Patent: Jun. 17, 2025

(54) TRUCK MOUNTING OF ENGINE BATTERY AND MOTOR

(71) Applicant: HONDA MOTOR CO., LTD., Tokyo (JP)

(72) Inventors: Toru Kawai, Wako (JP); Runa Nakamura, Wako (JP); Masaki Takahashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 305 days.

(21) Appl. No.: 17/830,031

(22) Filed: Jun. 1, 2022

(65) Prior Publication Data

US 2022/0289169 A1 Sep. 15, 2022

Related U.S. Application Data

(63) Continuation of application No. PCT/JP2019/047905, filed on Dec. 6, 2019.

(51) Int. Cl.

| | |
|---|---|
| *B60K 1/00* | (2006.01) |
| *B60W 10/06* | (2006.01) |
| *B60W 10/08* | (2006.01) |
| *B60W 20/13* | (2016.01) |
| *B60W 60/00* | (2020.01) |
| *F02D 41/04* | (2006.01) |
| *H01M 50/249* | (2021.01) |

(52) U.S. Cl.
CPC ........... *B60W 20/13* (2016.01); *B60W 10/06* (2013.01); *B60W 10/08* (2013.01); *B60W 60/00* (2020.02); *F02D 41/042* (2013.01); *H01M 50/249* (2021.01); *H01M 2220/20* (2013.01)

(58) Field of Classification Search
CPC ......... B60K 6/52; B60W 20/00; B60W 20/13; B60W 60/00; B60W 10/06; B60W 10/08; H01M 50/249; H01M 2220/20; F02D 41/042

See application file for complete search history.

(56) References Cited

U.S. PATENT DOCUMENTS

| | | | | |
|---|---|---|---|---|
| 6,554,088 B2 * | 4/2003 | Severinsky | ............... | B60K 6/22 180/65.23 |
| 7,219,497 B2 * | 5/2007 | Kowatari | .............. | B60W 10/06 60/608 |
| 7,497,285 B1 * | 3/2009 | Radev | ...................... | B60K 6/52 180/65.23 |

(Continued)

FOREIGN PATENT DOCUMENTS

| | | |
|---|---|---|
| JP | 2009-286304 A | 12/2009 |
| JP | 2011-218996 A | 11/2011 |

(Continued)

OTHER PUBLICATIONS

International Search Report dated Mar. 3, 2020, issued in counterpart International Application No. PCT/JP2019/047905, w/English Translation. (5 pages).

*Primary Examiner* — Gonzalo Laguarda
(74) *Attorney, Agent, or Firm* — WHDA, LLP (57) ABSTRACT

A truck is provided. An electric motor generates a traveling drive force. A battery supplies power to the electric motor. An engine drives a generator capable of charging the battery. The battery is provided between the electric motor and the engine in a front-and-rear direction of the truck.

14 Claims, 10 Drawing Sheets

(56) References Cited

U.S. PATENT DOCUMENTS

| | | | | |
|---|---|---|---|---|
| 8,191,342 | B2* | 6/2012 | Ishii | B60K 7/0015 |
| | | | | 56/320.1 |
| 8,893,838 | B2* | 11/2014 | Ichikawa | B60L 53/80 |
| | | | | 180/68.5 |
| 9,475,482 | B2* | 10/2016 | Niste | B60W 20/00 |
| 10,500,975 | B1* | 12/2019 | Healy | B60K 6/48 |
| 11,099,560 | B2* | 8/2021 | Smith | B60D 1/36 |
| 2009/0265058 | A1* | 10/2009 | Hasegawa | F02D 29/02 |
| | | | | 701/99 |
| 2023/0365120 | A1* | 11/2023 | Ramakrishnan | B60K 6/448 |

FOREIGN PATENT DOCUMENTS

| | | |
|---|---|---|
| JP | 2015-82888 A | 4/2015 |
| JP | 2016-7942 A | 1/2016 |
| JP | 2017-87783 A | 5/2017 |
| JP | 2019-143529 A | 8/2019 |

\* cited by examiner

TRUCK MOUNTING OF ENGINE BATTERY AND MOTOR

CROSS-REFERENCE TO RELATED APPLICATION(S)

This application is a continuation of International Patent Application No. PCT/JP2019/047905 filed on Dec. 6, 2019, the entire disclosure of which is incorporated herein by reference.

BACKGROUND OF THE INVENTION

Field of the Invention

The present invention relates to a hybrid truck.

Description of the Related Art

A hybrid working vehicle is known in which a battery is charged by a generator driven by an engine and a traveling motor is driven by power supplied from the battery (Japanese Patent Laid-Open No. 2016-7942). In addition, an unmanned carrier that travels electrically is known (Japanese Patent Laid-Open No. 2011-218996).

SUMMARY OF THE INVENTION

According to an embodiment of the present invention, there is provided a truck comprising: an electric motor that generates a traveling drive force; a battery that supplies power to the electric motor; and an engine that drives a generator capable of charging the battery, wherein the battery is provided between the electric motor and the engine in a front-and-rear direction of the truck.

DESCRIPTION OF THE EMBODIMENTS

In a hybrid vehicle, a plurality of heavy objects such as an engine, a motor, and a battery are mounted. Here, in a hybrid truck that is used as a carrier that travels with a load or the like loaded thereon, or that is used as a working vehicle equipped with a working machine that performs the predetermined work, it is desirable to improve a weight balance in consideration of stability during traveling on a rough road, battery replacement, and the like.

An embodiment of the present invention improves a weight balance of a hybrid truck.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

In addition, in each drawing, arrows X, Y, and Z indicate directions orthogonal to one another, the X direction indicates a front-and-rear direction of a truck, the Y direction indicates a vehicle width direction (a left-and-right direction) of the truck, and the Z direction indicates an up-and-down direction.

First Embodiment

<Outline of Truck>

Figure 1:
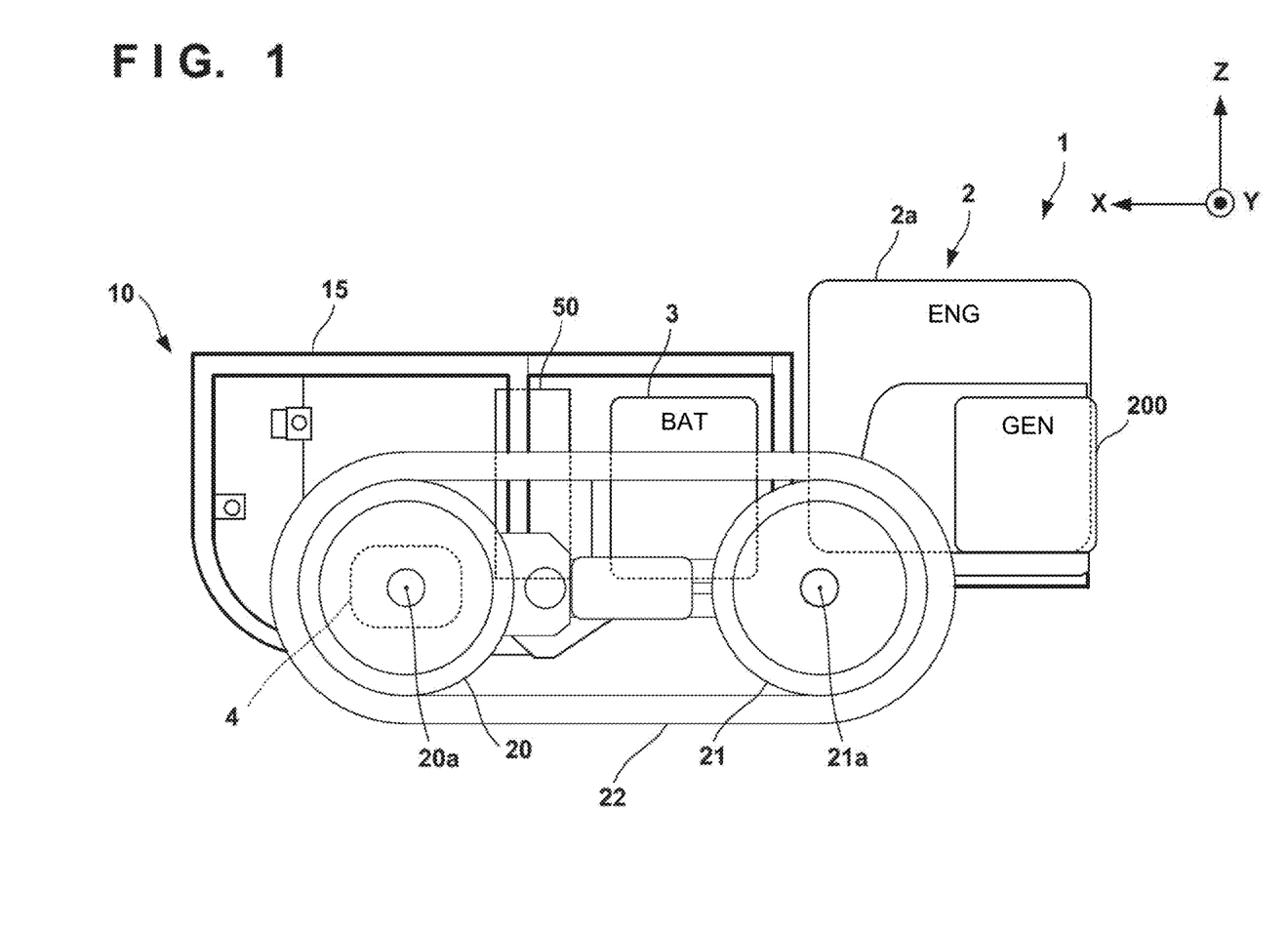
FIG. 1 is a left side view of a truck according to one embodiment.
Figure 2:
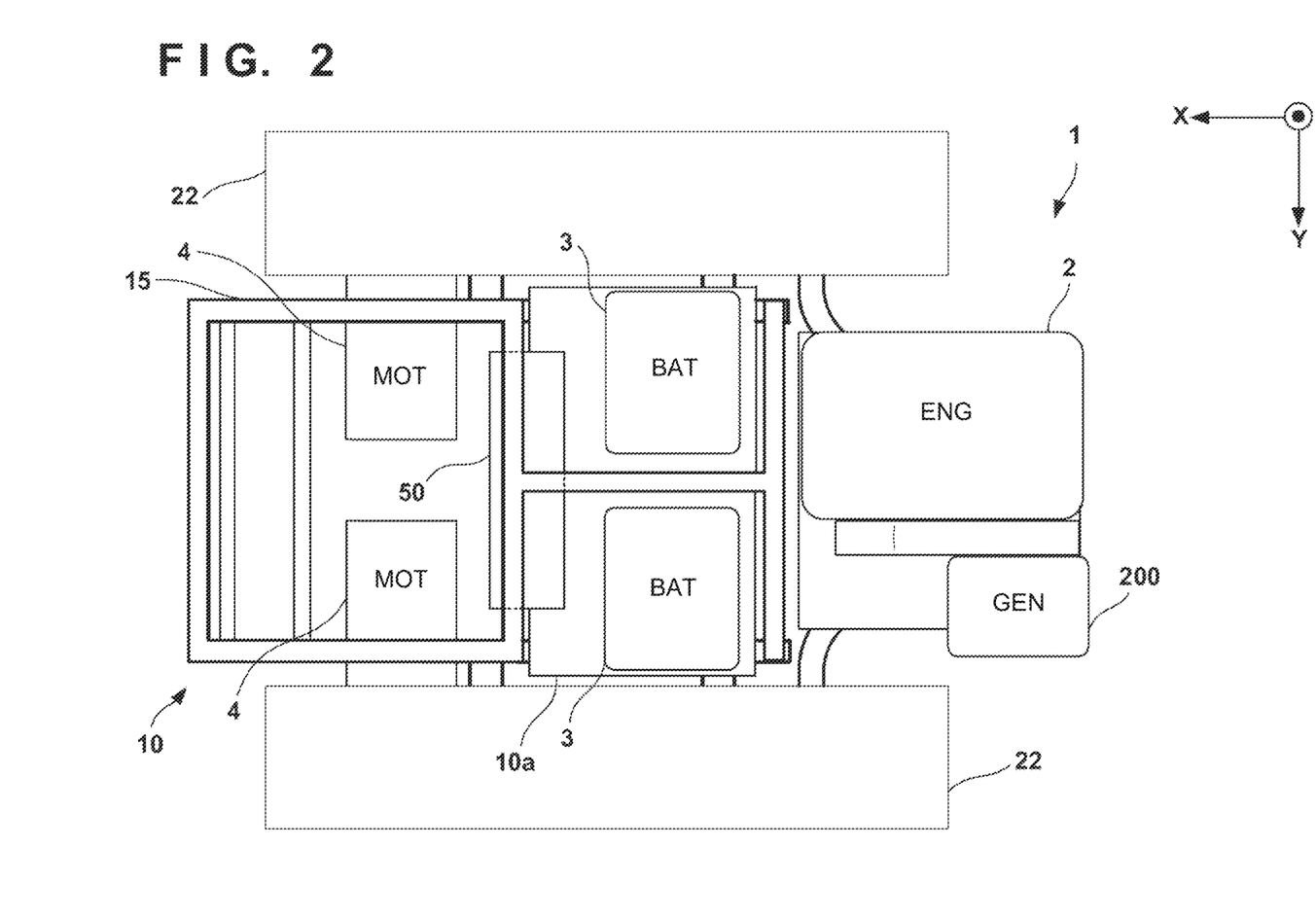
FIG. 2 is a plan view of the truck of FIG. 1.

FIG. 1 is a left side view of a truck 1 according to a first embodiment. In addition, FIG. 2 is a plan view of the truck 1 of FIG. 1. Note that these drawings are schematic diagrams, and mainly illustrate parts related to features of the embodiment described below.

The truck 1 is a hybrid truck, and includes left and right electric motors 4 (motors 4) that generate a traveling drive force, a battery 3 that supplies power to the motors 4, a generator 200 that can charge the battery 3, and an engine 2 that drives the generator 200. In other words, in the present embodiment, the truck 1 is a hybrid truck of a system in which power is generated by the engine 2 and traveling drive is enabled by the motor 4. However, the truck 1 may be a hybrid truck of a system in which the engine 2 not only generates power by the generator 200 but also generates a traveling drive force as necessary. That is, the truck 1 may have a configuration where both the engine 2 and the motor 4 function as a traveling drive source. Note that, in the present embodiment, the truck 1 has the motor 4 for traveling drive and the generator 200 for power generation, but the truck 1 may have a motor generator capable of executing both traveling drive and power generation.

The truck 1 can be used as a carrier by providing a cargo bed, or can be used as a working vehicle by mounting a predetermined working device. For example, the truck 1 can be used as a snow removing vehicle, a lawn mower, a tiller, or the like. In addition, the truck 1 can be used as a self-propelled truck or a working vehicle by mounting a control device capable of autonomously controlling the truck 1. The truck 1 includes a vehicle body frame 10, a front wheel 20, a rear wheel 21, a crawler belt 22, a control unit 50, and a detection unit 52 (see FIG. 3).

The vehicle body frame 10 is a member forming a skeleton of the truck 1, and is formed of, for example, a metal material. The vehicle body frame 10 supports the engine 2, the generator 200, the battery 3, and the motor 4. In the present embodiment, the vehicle body frame 10 has a mounting portion 15 on which a predetermined mounted component can be mounted on a top surface thereof. For example, when the truck 1 is used as a carrier, a cargo bed (not illustrated) may be mounted on the mounting portion 15. As a result, a user or the like can load a cargo on the cargo bed. In addition, for example, when the truck 1 is used as a working vehicle, a working device (not illustrated) that performs the predetermined work may be mounted on the mounting portion 15. As a result, the working vehicle can perform the predetermined work by the working device while traveling by the truck 1. Note that the working device is not limited to being mounted on the mounting portion 15, and an attachment type working device in which the working device is attached to any portion of the truck 1 by a fastening mechanism such as a bolt can also be adopted.

The front wheel 20 and the rear wheel 21 are rotatably supported by the vehicle body frame 10, for example. In the present embodiment, two front wheels 20 and two rear wheels 21 are provided to be separated from each other in the left-and-right direction. That is, the truck 1 is a four-wheeled vehicle. The endless crawler belt 22 is wound around the front wheel 20 and the rear wheel 21 on each of the left and right sides. However, in the truck 1, there may be one or three or more of the front wheel FW and the rear wheel RW. In addition, the truck 1 can also adopt a configuration not including the crawler belt 22.

In the present embodiment, the left and right front wheels 20 are driven by the left and right motors 4, respectively. That is, the front wheel 20 is a drive wheel, and the rear wheel 21 is a driven wheel driven by the front wheel 20 via the crawler belt 22. As described above, since the left and right front wheels 20 are independently driven by the left and right motors 4, respectively, the truck 1 can change the traveling direction or turn (ultra-pivotal deployment) on the spot depending on the difference in the rotation speed or the difference in the rotation direction of the left and right front wheels 20. Note that, in the truck 1, a configuration in which the rear wheel 21 is a drive wheel and the front wheel 20 is a driven wheel can also be adopted.

Figure 3:
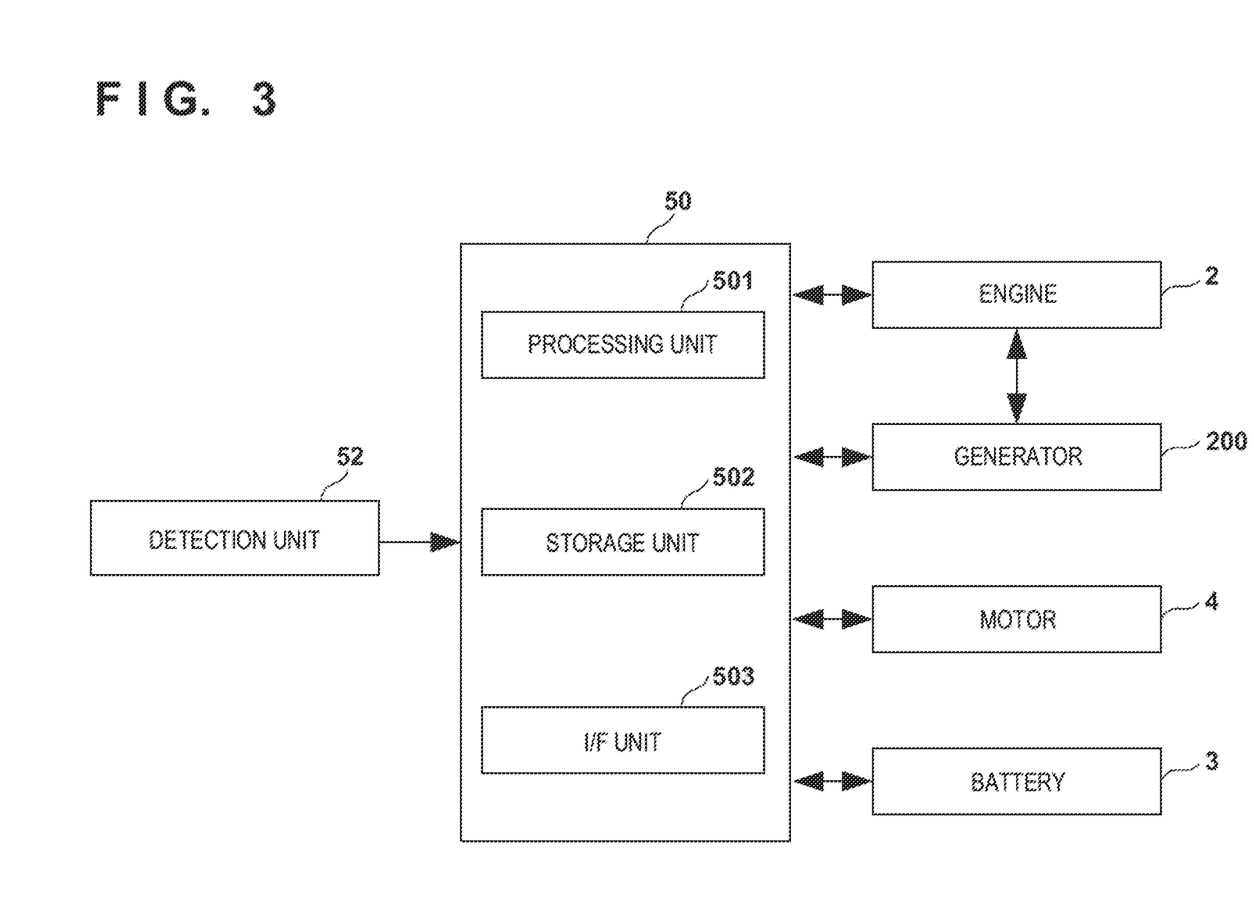
FIG. 3 is a diagram illustrating an example of a hardware configuration of the truck of FIG. 1.

The control unit 50 is a unit that controls the operation of each component of the truck 1, and is, for example, an electronic control unit (ECU). FIG. 3 is a diagram illustrating an example of a hardware configuration of the truck 1 of FIG. 1. The control unit 50 includes a processing unit 501, a storage unit 502 such as a RAM and a ROM, and an interface unit 503 (I/F unit) that relays transmission and reception of signals between an external device and the processing unit 501. The processing unit 501 is a processor represented by a CPU, and executes a program stored in the storage unit 502. In addition to the program executed by the processing unit 501, data and the like used by the processing unit 501 for processing are stored in the storage unit 502.

The processing unit 501 controls power generation by the engine 2 and the generator 200. For example, the processing unit 501 controls the output of the engine 2 according to a power storage amount of the battery 3. Further, for example, the processing unit 501 controls the start and stop of the engine 2.

The processing unit 501 controls the autonomous traveling of the truck 1. For example, the processing unit 501 performs autonomous traveling control of the truck 1 by controlling the outputs of the left and right motors 4 of the truck 1 on the basis of a detection result of the detection unit 52, a predetermined traveling route, and the like. The detection unit 52 is a unit that detects information around the truck 1, and is, for example, a camera, a GPS, a millimeter wave radar, a light detection and ranging (LiDAR), or the like. When the working device is mounted on the mounting portion 15, the processing unit 501 may control the work by the working device.

Note that the control unit 50 may be configured to include a plurality of electronic control units (ECUs), and each may include a processor, a storage device, and an external I/F. For example, in the autonomous traveling, an ECU (autonomous control ECU) that determines the operation of the truck 1 on the basis of the detection result of the detection unit 52 and an ECU (traveling control ECU) that controls the drive of the motor 4 so as to perform the operation determined by the ECU may be provided. Further, these ECUs may not be included in one control unit 50, and may be configured to be mountable on the truck 1 as separate control units. When the working device is mounted on the mounting portion 15, a control unit that controls the working device may be separately mounted on the truck 1, or the working device on which the control unit 50 is mounted may be controlled.

Arrangement Example of Each Component

FIGS. 1 and 2 are referred to again. A plurality of heavy objects such as the engine 2, the battery 3, and the motor 4 are mounted on the hybrid truck 1 according to the present embodiment, and the following arrangement is adopted in order to improve the weight balance of the vehicle. That is, in the truck 1 of the present embodiment, the battery 3 is provided between the motor 4 and the engine 2 in the front-and-rear direction of the truck 1. As a result, since the engine 2, the battery 3, and the motor 4, which are heavy objects, are arranged side by side in the front-and-rear direction of the truck 1, the overall weight balance can be improved. In addition, the battery 3 that may be removed for replacement due to charging or aging is disposed between the engine 2 and the motor 4. For this reason, even when the battery 3 is removed, it is possible to suppress the deviation of the center of gravity of the truck 1 and to maintain the weight balance. Furthermore, since these heavy objects are arranged not in the up-and-down direction or the like but in the front-and-rear direction, the center of gravity of the truck 1 can be lowered, and the stability of the truck 1 can be improved. In addition, since the heavy objects are arranged in the front-and-rear direction, the surface pressure due to the drive force applied to the crawler belt 22 is dispersed, and the durability of the crawler belt 22 can be improved. In addition, since the surface pressure is dispersed, it is possible to suppress the ground from being scooped by a local load applied to the ground in contact with the crawler belt 22. Note that, in the present embodiment, the motor 4 is disposed on the front side of the battery 3 and the engine 2 is disposed on the rear side, but a configuration in which the engine 2 is disposed on the front side of the battery 3 and the motor 4 is disposed on the rear side can also be adopted. Even in this case, the truck 1 may use either the rear wheel 21 or the front wheel 20 as the drive wheel.

In the present embodiment, the battery 3 is disposed between a rotating shaft 20a of the front wheel 20 and a drive shaft 21a of the rear wheel 21 in the front-and-rear direction of the truck 1. Therefore, since the battery 3 is arranged at the center of the truck 1 in the front-and-rear direction, the weight balance of the truck 1 can be further improved.

Further, in the present embodiment, the two batteries 3 are arranged side by side in the vehicle width direction. As a result, the truck 1 can be downsized in the front-and-rear direction. Note that the number of batteries 3 is not limited to two, and may be one or three or more. When three or more batteries 3 are provided, these batteries 3 may be arranged side by side in the vehicle width direction.

Further, in the present embodiment, the motor 4 is disposed so as to partially overlap the front wheel 20 in side view of the truck 1, and the engine 2 is disposed so as to partially overlap the rear wheel 21 in the side view of the truck 1. As a result, the load of the heavy object can be dispersed and applied to the side of the front wheel 20 and the side of the rear wheel 21. Further, as a result, the surface pressure due to the drive force applied to the crawler belt 22 is more effectively dispersed, so that the durability of the crawler belt 22 can be improved.

Further, in the present embodiment, the control unit 50 is provided between the motor 4 and the battery 3 in the front-and-rear direction of the truck 1. Since the motor 4, the control unit 50, and the battery 3 are arranged side by side, electrical connection members are shortened, and the wiring can be facilitated and the cost can be reduced.

Further, in the present embodiment, the engine 2 is supported by the vehicle body frame 10 such that the upper end 2a of the engine 2 protrudes upward from the upper end of the mounting portion 15. As a result, since the mounted component mounted on the mounting portion 15 is disposed at a relatively low position in the up-and-down direction, the center of gravity of the vehicle as a whole can be lowered.

Further, in the present embodiment, the generator 200 is provided behind the battery 3 in the front-and-rear direction of the truck 1. Further, the generator 200 is provided so as to overlap the engine 2 in the side view of the truck 1. That is, since the engine 2 and the generator 200 are arranged side by side in the vehicle width direction, the truck 1 can be downsized in the front-and-rear direction.

Note that, in the present embodiment, in the front-and-rear direction of the truck 1, the rear end of the motor 4 is located in front of the front end of the battery 3, and the rear end of the battery 3 is located in front of the front end of the engine 2. However, in the front-and-rear direction of the truck 1, a part of the battery 3 may be disposed in front of the rear end of the motor 4, or a part of the engine 2 may be disposed in front of the rear end of the battery 3. In such a case, for example, the engine 2, the battery 3, and the motor 4 may be provided such that the center of gravity of the battery 3 is positioned between the center of gravity of the motor 4 and the center of gravity of the engine 2 in the front-and-rear direction of the truck 1.

<Lock Mechanism of Battery>

Figure 4A:
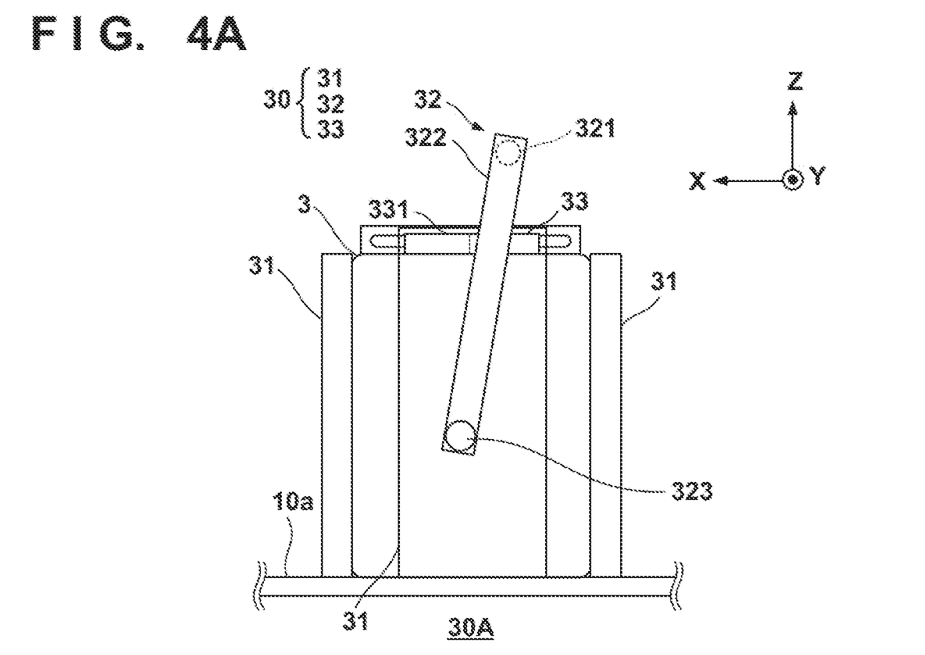
FIG. 4A is a diagram schematically illustrating a lock mechanism of a battery, and is a left side view of the battery and the lock mechanism in a case where the lock mechanism is in a lock state.
Figure 4B:
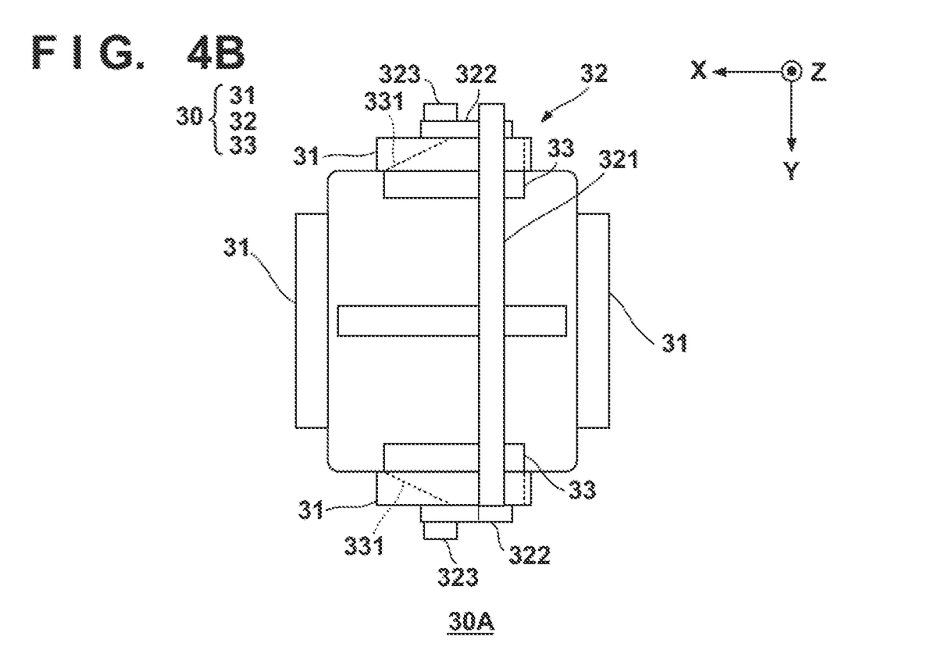
FIG. 4B is a diagram schematically illustrating the lock mechanism of the battery, and is a plan view of the battery and the lock mechanism in a case where the lock mechanism is in a lock state.
Figure 5A:
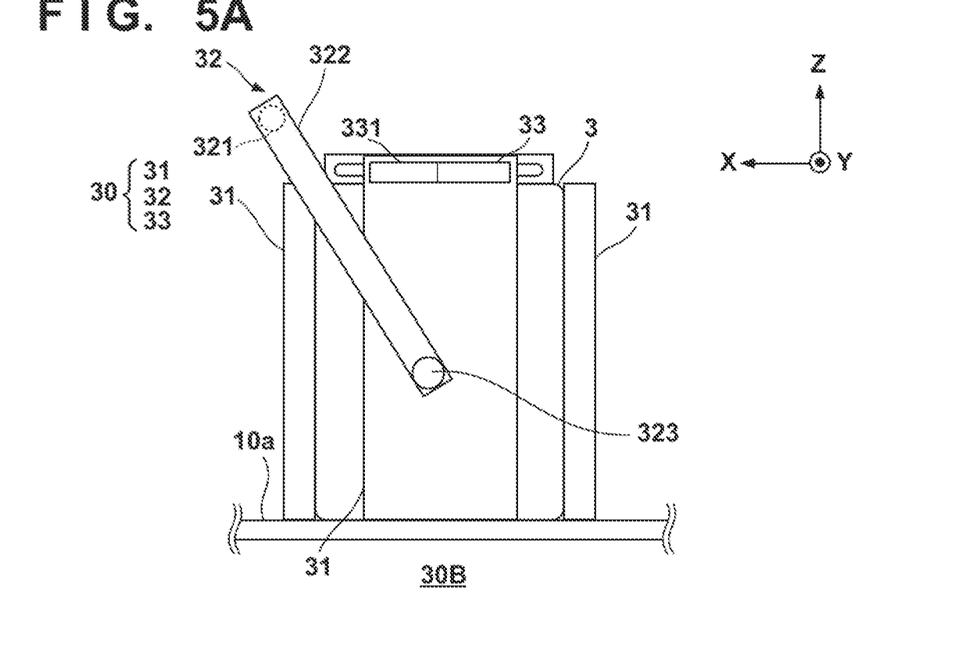
FIG. 5A is a diagram schematically illustrating the lock mechanism of the battery, and is a left side view of the battery and the lock mechanism in a case where the lock mechanism is in a release state.
Figure 5B:
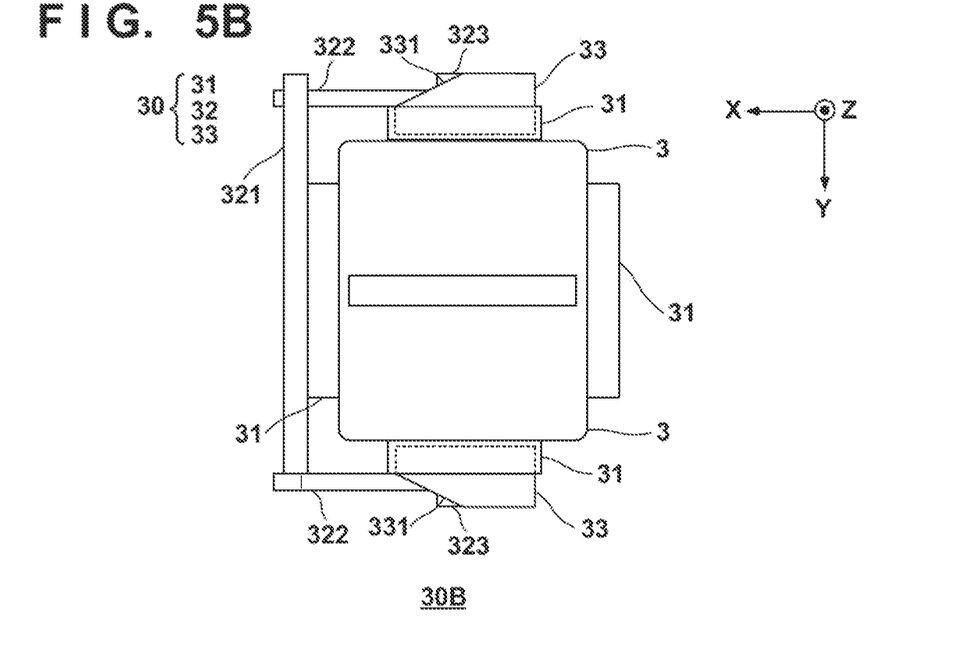
FIG. 5B is a diagram schematically illustrating the lock mechanism of the battery, and is a plan view of the battery and the lock mechanism in a case where the lock mechanism is in a release state.

FIGS. 4A to 5B are diagrams schematically illustrating the lock mechanism 30 of the battery 3. FIG. 4A is a left side view of the battery 3 and the lock mechanism 30 when the lock mechanism 30 is in a lock state 30A, and FIG. 4B is a plan view of the battery 3 and the lock mechanism 30 when the lock mechanism 30 is in the lock state 30A. In addition, FIG. 5A is a left side view of the battery 3 and the lock mechanism 30 when the lock mechanism 30 is in a release state 30B, and FIG. 5B is a plan view of the battery 3 and the lock mechanism 30 when the lock mechanism 30 is in the release state 30B.

The lock mechanism 30 is a mechanism for locking the battery 3 in a state of being mounted on the vehicle body frame 10, and includes a positioning member 31, a lever 32, and a regulation member 33.

In the present embodiment, the positioning members 31 are four plate-like members made of a metal material, and are provided on a bracket 10a provided on the vehicle body frame 10. In other words, the positioning member 31 is supported by the vehicle body frame 10 via the bracket 10a. The positioning members 31 are provided so as to sandwich the battery 3 in the front-and-rear direction and the vehicle width direction in a state where the battery 3 is mounted on the vehicle body frame 10. As a result, the position of the battery 3 in the front-and-rear direction and the vehicle width direction of the truck 1 is regulated. In addition, since the positioning member 31 functions as a guide when the battery 3 is attached or detached, the user can attach or detach the battery 3 in the up-and-down direction in which the battery 3 does not interfere with the motor 4 or the engine 2.

The lever 32 is used for switching the state of the lock mechanism 30 between the lock state 30A and the release state 30B, and is rotatably provided on the positioning member 31. In the present embodiment, the state of the lock mechanism 30 is switched between the lock state 30A and the release state 30B by the regulation member 33 being displaced in accordance with the rotation of the lever 32. The lever 32 includes a grip portion 321, a side portion 322, and a rotating shaft member 323.

The grip portion 321 is a portion that can be gripped by the user to rotate the lever 32, and is provided to extend in the vehicle width direction in the present embodiment. The rotating shaft member 323 is a member that forms a rotating shaft when the lever 32 rotates. The side portion 322 connects both end portions of the grip portion 321 and the rotating shaft member 323. As a result, when the user grips and operates the grip portion 321, the grip portion 321 and the side portion 322 rotate about the rotating shaft formed by the rotating shaft member 323.

The regulation member 33 is a member capable of regulating the movement of the battery 3 in the up-and-down direction. The regulation member 33 is displaced between a lock position (FIGS. 4A and 4B) for regulating the movement of the battery 3 in the up-and-down direction and a release position (FIGS. 5A and 5B) for releasing the regulation by the rotation of the lever 32. In addition, the regulation member 33 includes an inclined portion 331 that abuts on the side portion 322 of the lever 32.

For example, the regulation member 33 is provided so as to be biased to the outside in the vehicle width direction of the truck 1. As a result, the battery 3 and the regulation member 33 do not overlap each other in plan view of the truck 1 at the release position (FIG. 5B), so that the user can remove the battery 3. On the other hand, when the lever 32 rotates from the release state 30B in FIGS. 5A and 5B to the lock state 30A illustrated in FIGS. 4A and 4B, the side portion 322 rotates while abutting on the inclined portion 331 of the regulation member 33, so that the regulation member 33 is displaced inward in the vehicle width direction of the truck 1 (FIG. 4B). As a result, at the lock position, the battery 3 and the regulation member 33 overlap each other in plan view of the truck 1, and the movement of the battery 3 in the up-and-down direction is locked by the regulation member 33.

In the present embodiment, the user operates the lever 32, so that the lock mechanism 30 can be manually switched between the lock state 30A and the release state 30B. As a result, the user can remove the battery 3 from the vehicle body frame 10 without requiring a tool or the like.

Note that, in the present embodiment, the regulation member 33 of the lock mechanism 30 can regulate the upward movement of the battery 3, and the user can remove the battery 3 in the upward direction by releasing the regulation by the regulation member 33. However, it is also possible to adopt a configuration in which the battery 3 is removed downward. That is, it is possible to adopt a configuration in which the battery 3 is attachable and detachable in the up-and-down direction with respect to the vehicle body frame 10, and in this case, the battery 3 may be removed in the upward direction or may be removed in the downward direction. As an example, in a case where the battery 3 is configured to be removable downward from the mounting position on the vehicle body frame 10, a regulation member capable of regulating the downward movement of the battery 3 may be provided. The battery 3 may be mounted on the vehicle body frame 10 by regulating the movement of the battery 3 with the regulation member, and the battery 3 may be removed downward by releasing the regulation of the movement of the battery 3 with the regulation member.

Note that the configuration of the lock mechanism 30 is an example, and other configurations can also be adopted. In the present embodiment, the battery 3 is mechanically locked, but the battery 3 may be locked by other mechanical mechanism. For example, the regulation member may be switched between the lock state and the release state by an electric actuator, or locking of the battery 3 and releasing of the locking may be performed by an electromagnet.

As described above, according to the present embodiment, the battery 3 is provided between the motor 4 and the engine 2 in the front-and-rear direction of the truck 1. As a result, since the engine 2, the battery 3, and the motor 4, which are heavy objects, are arranged side by side in the front-and-rear direction of the truck 1, the overall weight balance can be improved.

Second Embodiment

Figure 6:
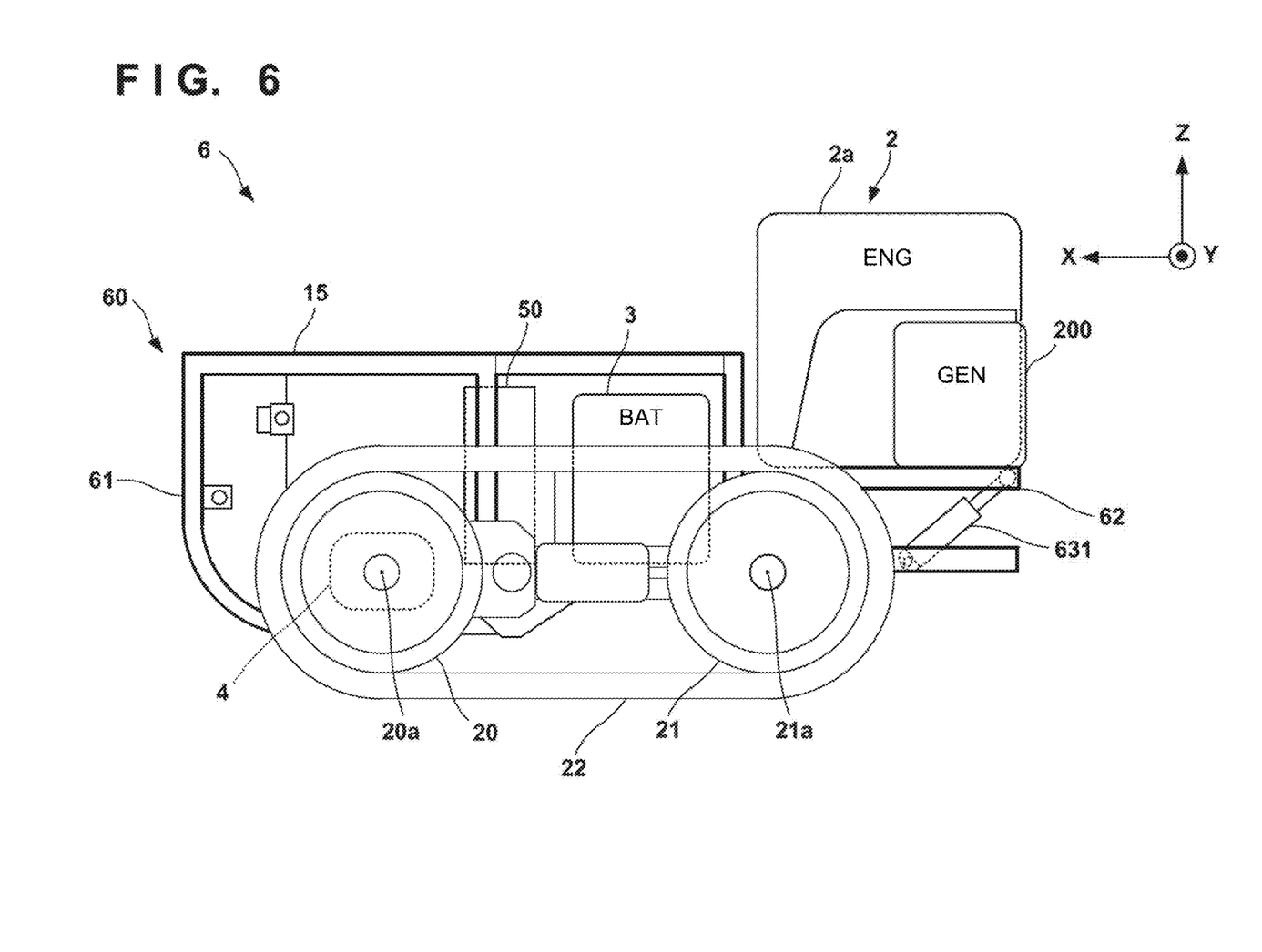
FIG. 6 is a left side view of a truck according to one embodiment.
Figure 7:
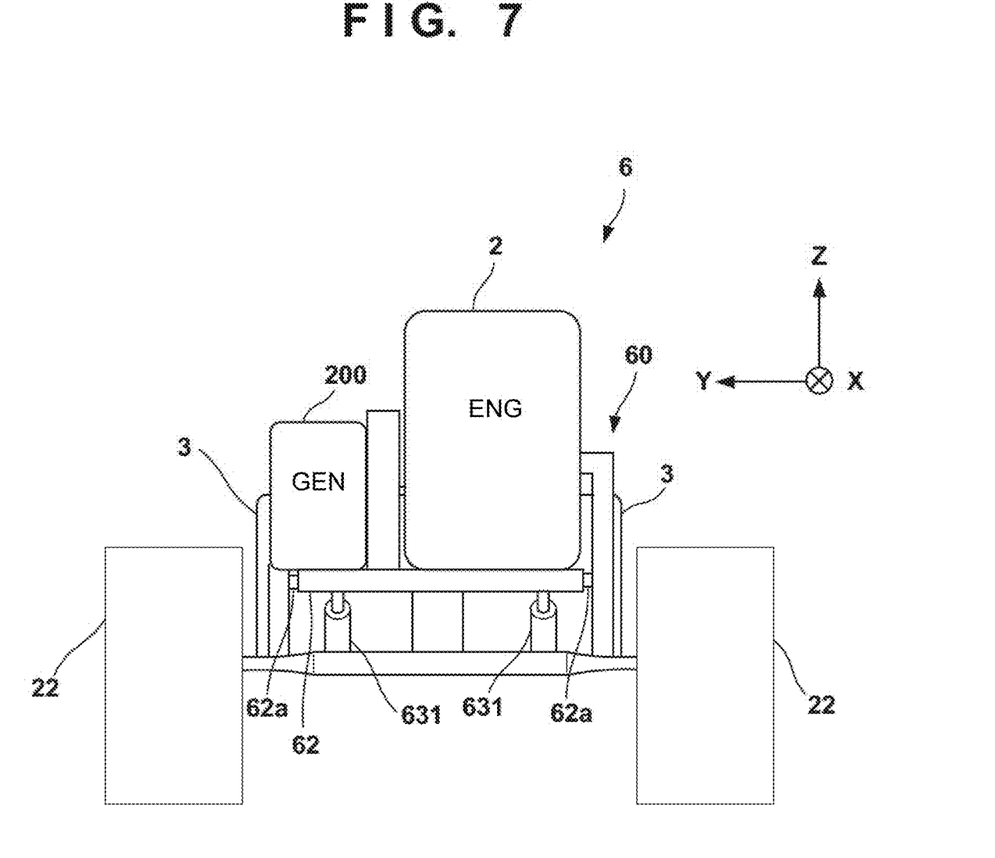
FIG. 7 is a plan view of the truck of FIG. 6.

FIG. 6 is a left side view of a truck 6 according to a second embodiment. In addition, FIG. 7 is a plan view of the truck 6 of FIG. 6. The second embodiment is different from the first embodiment in that an engine 2 is supported by a vehicle body frame 60 while its inclination is suppressed by an inclination suppression mechanism 63.

The inclination of the engine 2 needs to be maintained at a certain level or less from the viewpoint of preventing seizure of the engine due to insufficient lubrication of engine oil, or the like. However, when the truck 6 is used for a carrier that travels on sloping land or a working vehicle or the like that performs the work on sloping land, the inclination of the engine 2 may increase. Therefore, in the second embodiment, the inclination of the engine 2 is suppressed by the inclination suppression mechanism 63. Hereinafter, differences from the first embodiment will be mainly described. Note that FIGS. 6 and 7 are schematic diagrams, and mainly illustrate parts related to features of the embodiment described below.

The truck 6 includes a vehicle body frame 60 forming a skeleton thereof. The vehicle body frame 60 includes a front portion 61 that supports a battery 3 and a motor 4, and a rear portion 62 that supports the engine 2. In addition, the rear portion 62 is connected to the front portion 61 so as to be rotatable about an axis extending in a vehicle width direction by a rotating shaft member 62a. Therefore, even when the truck 6 is affected by the terrain of the truck 6 and the front portion 61 is inclined, the rear portion 62 is rotated with respect to the front portion 61, so that the inclination thereof can be suppressed.

In addition, the rear portion 62 is held in a state where the inclination is suppressed by the inclination suppression mechanism 63. Therefore, the engine 2 is supported by the rear portion 62 of the vehicle body frame 60 while the inclination is suppressed by the inclination suppression mechanism 63.

Figure 8:
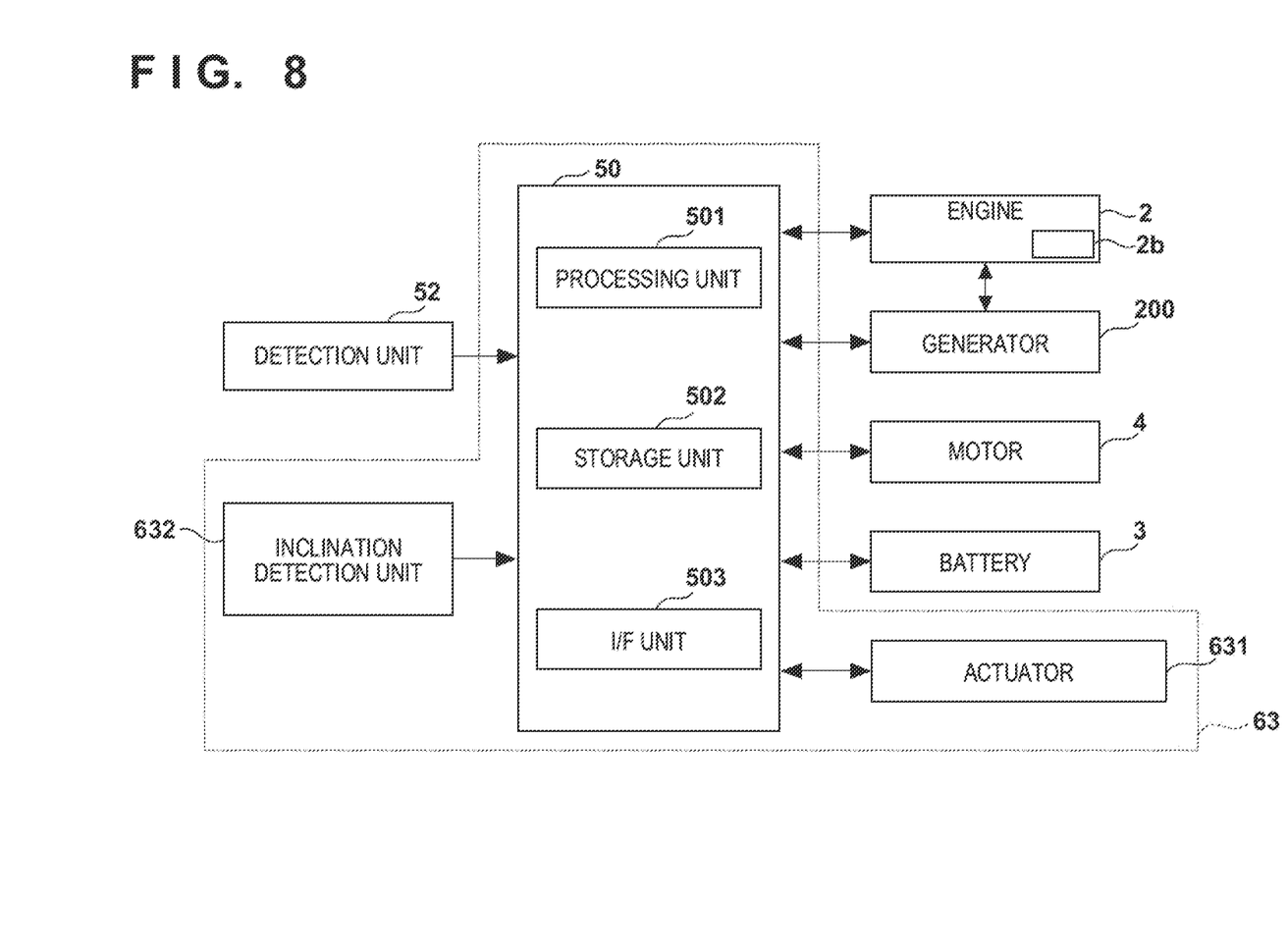
FIG. 8 is a diagram illustrating an example of a hardware configuration of the truck of FIG. 6.

Reference is also made to FIG. 8. FIG. 8 is a diagram illustrating an example of a hardware configuration of the truck 6 of FIG. 6. The inclination suppression mechanism 63 is a mechanism for suppressing the inclination of the rear portion 62, the engine 2 supported by the rear portion, and the like, and includes an actuator 631, an inclination detection unit 632, and a control unit 50 in the present embodiment.

The inclination detection unit 632 detects the inclination of the rear portion 62. For example, the inclination detection unit 632 may be a pendulum type or float type inclination sensor capable of directly detecting the inclination of the rear portion 62. Further, for example, the inclination detection unit 632 may be an acceleration sensor or a gyro sensor, and in this case, the processing unit 501 may acquire the inclination of the rear portion 62 on the basis of a detection result of the inclination detection unit 632.

The actuator 631 adjusts the inclination of the rear portion 62. In the present embodiment, the actuator 631 is a cylinder. By the stroke of a cylinder, the inclination of the rear portion 62 is changed.

The processing unit 501 of the control unit 50 controls drive of the actuator 631 on the basis of a detection result of the inclination detection unit 632. As an example, the processing unit 501 may feedback-control the stroke of the actuator 631 to be the cylinder such that the inclination of the rear portion 62 acquired on the basis of the detection result of the inclination detection unit 632 falls within a predetermined range. The predetermined range is, for example, a range in which the inclination of the rear portion 62 is within ±20 degrees from a horizontal state. Furthermore, the predetermined range may be a range in which the inclination of the rear portion 62 is within ±10 degrees or within ±5 degrees from the horizontal state.

Further, in the present embodiment, the engine 2 is provided with an oil alert mechanism 2b. The oil alert mechanism 2b is a mechanism (engine stop mechanism) for detecting the inclination of the engine 2 and stopping drive of the engine 2 when the inclination of the engine 2 exceeds a predetermined threshold to prevent seizure of the engine 2. Although the inclination of the engine 2 is suppressed by the inclination suppression mechanism 63 in the present embodiment, the oil alert mechanism 2b stops drive of the engine 2 when the engine 2 is significantly inclined to a range in which the inclination cannot be suppressed by the inclination suppression mechanism 63. As an example, the predetermined threshold at which the oil alert mechanism 2b stops drive of the engine 2 is a value of 20 to 30 degrees. Furthermore, the predetermined threshold is 25 degrees.

As described above, according to the present embodiment, the rear portion 62 of the vehicle body frame 10 on which the engine 2 is supported is rotatably provided with respect to the front portion 61, and the inclinations of the rear portion 62 and the engine 2 are suppressed by the inclination suppression mechanism 63. Therefore, even when the truck 6 is inclined as a whole, the inclination of the engine 2 can be suppressed. As a result, it is possible to prevent seizure of the engine due to insufficient lubrication of the engine oil. Further, according to the present embodiment, even when the inclination of the engine 2 cannot be suppressed by the inclination suppression mechanism 63, the drive of the engine 2 is stopped by the oil alert mechanism 2b, so that it is possible to further prevent seizure of the engine due to insufficient lubrication of the engine oil.

Note that the configuration of the inclination suppression mechanism 63 is an example. That is, the configuration of the inclination suppression mechanism 63 can be appropriately changed so that the processing unit 501 can control the actuator 631 such that the inclination of the rear portion 62 falls within a predetermined range on the basis of the detection result of the inclination detection unit 632.

Third Embodiment

Figure 9:
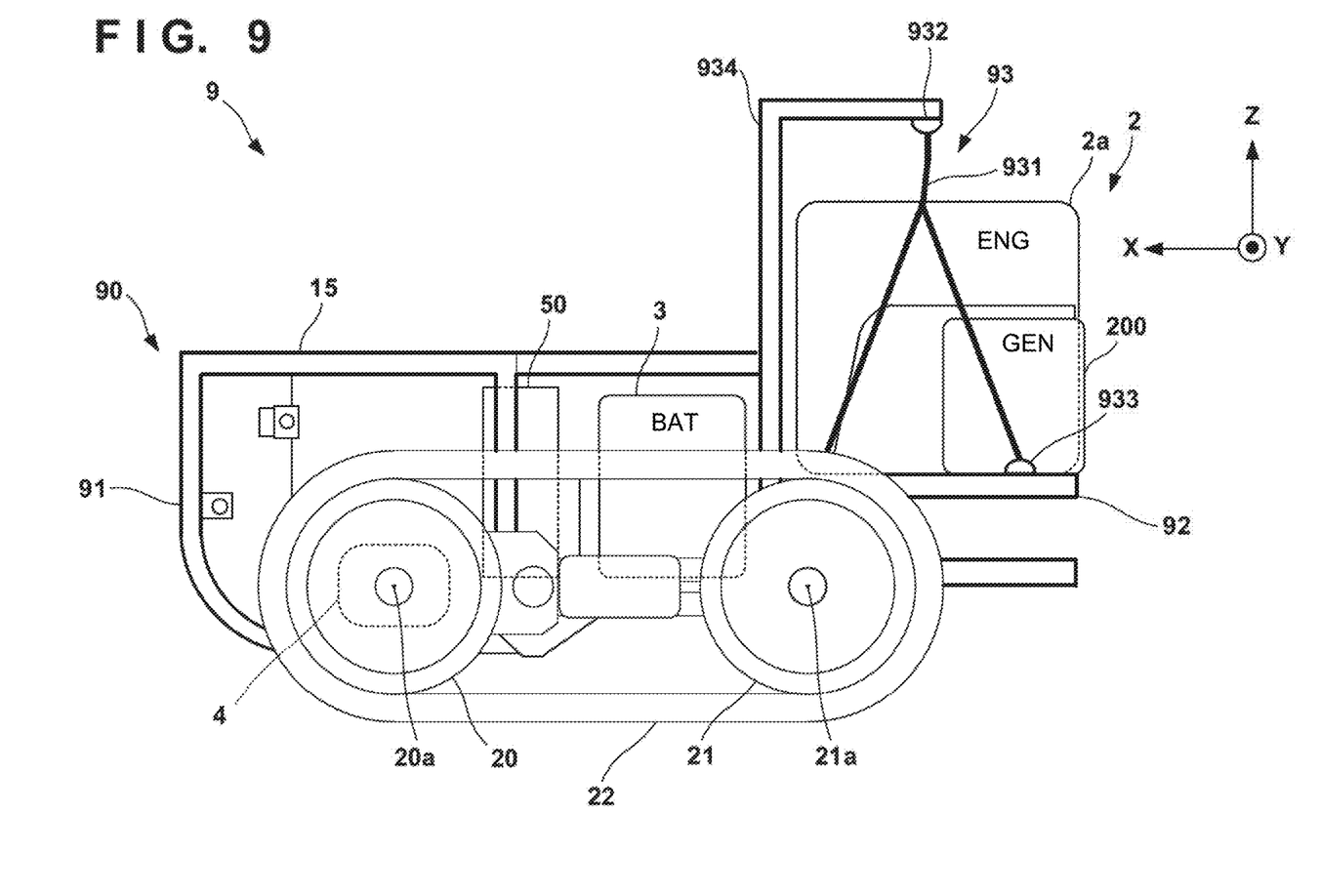
FIG. 9 is a left side view of a truck according to one embodiment.
Figure 10:
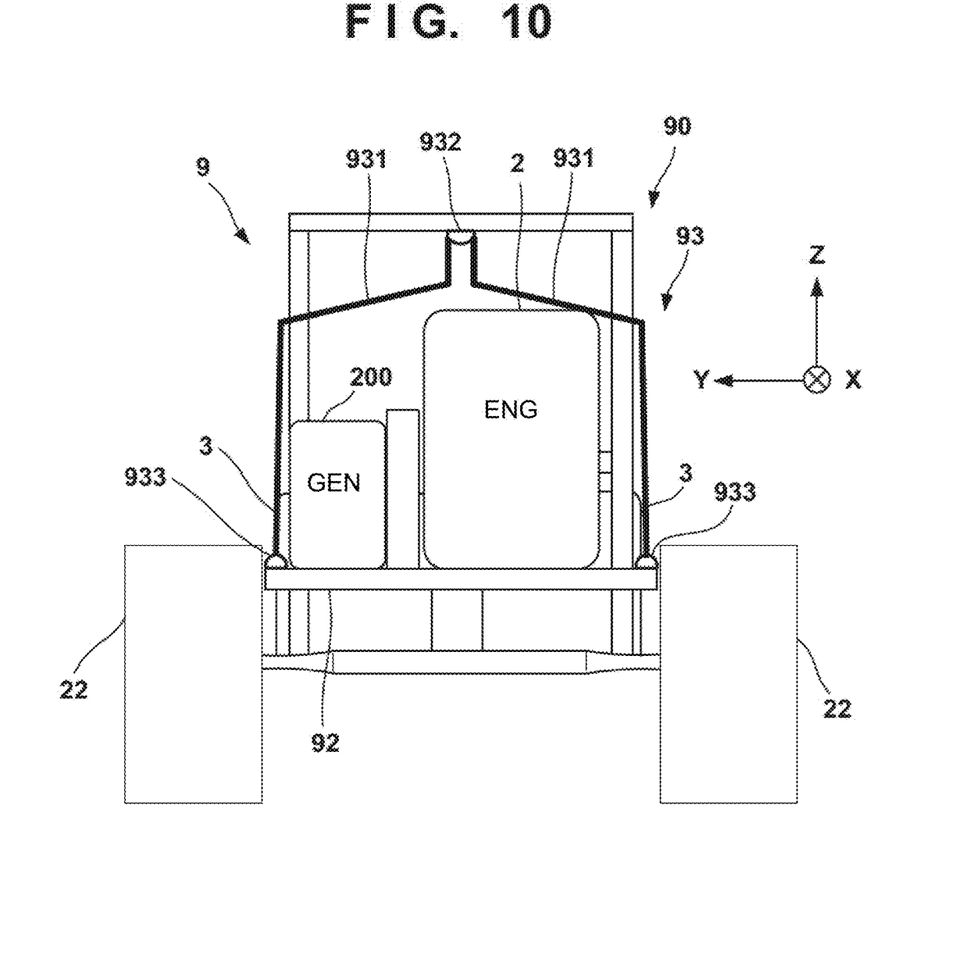
FIG. 10 is a plan view of the truck of FIG. 9.

In the second embodiment, a configuration in which an inclination suppression mechanism 63 suppresses an inclination of an engine 2 by control has been described. In a third embodiment, a configuration in which an inclination suppression mechanism 93 structurally suppresses the inclination of the engine 2 will be described. FIG. 9 is a left side view of a truck 9 according to the third embodiment, and FIG. 10 is a plan view of the truck 9 of FIG. 9. Note that FIGS. 9 and 10 are schematic diagrams, and mainly illustrate parts related to features of the embodiment described below.

The truck 9 includes a vehicle body frame 90 forming a skeleton thereof. The vehicle body frame 90 includes a front portion 91 that supports a battery 3 and a motor 4, and a rear portion 92 that supports the engine 2. The rear portion 92 is provided so as to be suspended by the inclination suppression mechanism 93.

The inclination suppression mechanism 93 is a mechanism for suppressing the inclinations of the rear portion 92 and the engine 2 and the like supported by the rear portion, and includes a wire 931, wire support portions 932 and 933, and an extension portion 934 in the present embodiment.

The extension portion 934 is a frame extended upward and rearward from the front portion 91. In addition, the wire 931 is suspended from the extension portion 934. The wire 931 is supported by the extension portion 934 by the wire support portion 932 and is supported by the rear portion 92 by the wire support portion 933, thereby holding the rear portion 92 in a suspended state. In the present embodiment, the rear portion 92 is held using two bifurcated wires 931. As described above, the rear portion 92 is held in the suspended state. For this reason, even when the truck 9 is affected by the terrain and the front portion 91 is inclined, the inclinations of the rear portion 92 and the engine 2 supported by the rear portion 92 can be suppressed. Note that, between the wire 931 and the wire support portion 932, for example, a device for absorbing shock or damping vibration, such as a shock absorber, may be provided.

As described above, according to the present embodiment, the rear portion 92 of the vehicle body frame 90 on which the engine 2 is supported is provided in a state of being suspended from the inclination suppression mechanism 93. Therefore, even when the truck 9 is inclined as a whole, the inclination of the engine 2 can be suppressed. As a result, it is possible to prevent seizure of the engine due to insufficient lubrication of the engine oil. In addition, in the present embodiment, since the inclination suppression mechanism 93 structurally suppresses the inclination of the engine 2, control of an actuator or the like is unnecessary, and the inclination of the engine 2 can be suppressed with a simpler configuration.

Summary of Embodiments

The above-described embodiments disclose at least a truck to be described as follows.

1. A truck (for example 1) of the above embodiments comprises:
   an electric motor (for example 4) that generates a traveling drive force;
   a battery (for example 3) that supplies power to the electric motor; and
   an engine (for example 2) that drives a generator capable of charging the battery, wherein
   the battery is provided between the electric motor and the engine in a front-and-rear direction of the truck.

According to this embodiment, since the engine, the battery, and the electric motor, which are heavy objects, are arranged side by side in the front-and-rear direction of the truck, the weight balance of the entire truck can be improved.

2. According to the above embodiments, the truck further comprises:
   a front wheel (for example 20) and a rear wheel (for example 21), wherein
   the battery is disposed between a drive shaft (for example 20a) of the front wheel and a drive shaft (for example 21a) of the rear wheel in the front-and-rear direction of the truck.

According to this embodiment, since the battery is disposed at the center of the truck in the front-and-rear direction, the weight balance of the truck can be further improved.

3. According to the above embodiments, wherein
   the electric motor is disposed so as to at least partially overlap one of the front wheel and the rear wheel in side view of the truck, and
   the engine is disposed so as to at least partially overlap the other of the front wheel and the rear wheel different from the one of the front wheel and the rear wheel in side view of the truck.

According to this embodiment, a load of a heavy object can be dispersed and applied to the side of the front wheel and the side of the rear wheel.

4. According to the above embodiments, wherein
   the front wheel is driven by at least the electric motor, and
   the rear wheel is driven by the front wheel, and
   the engine is provided behind the battery in the front-and-rear direction of the truck.

According to this embodiment, since the engine is provided behind the battery, the electric motor that drives the front wheel can be provided near the front wheel while the weight balance of the entire truck is improved.

5. According to the above embodiments, the truck further comprises:
   a control unit (for example 50) that controls at least the electric motor, wherein
   the control unit is disposed between the electric motor and the battery in the front-and-rear direction of the truck.

According to this embodiment, since the electric motor, the control unit, and the battery are arranged side by side, electrical connection members are shortened, and the wiring can be facilitated and the cost can be reduced.

6. According to the above embodiments, the truck further comprises:
   a vehicle body frame (for example 10) that supports the engine, the electric motor, and the battery, wherein
   the battery is attachable and detachable with respect to the vehicle body frame.

According to this embodiment, the battery can be attached to and detached from the vehicle body frame.

7. According to the above embodiments, wherein
the battery is attachable and detachable in an up-and-down direction with respect to the vehicle body frame.

According to this embodiment, the battery can be attached and detached in an up-and-down direction that does not interfere with the electric motor or the engine.

8. According to the above embodiments, the truck the truck further comprises:
a lock mechanism (for example 30) that is capable of manually switching between a lock state (for example 30A) in which the battery is locked with respect to the vehicle body frame and a release state (for example 30B) in which the battery is removable from the vehicle body frame.

According to this embodiment, while the battery is fixed to the vehicle body frame 10 in the lock state, the user can manually remove the battery in the release state.

9. According to the above embodiments, wherein
a plurality of batteries are provided, and
the plurality of batteries are disposed side by side in a vehicle width direction.

According to this embodiment, the truck can be downsized in the front-and-rear direction.

10. According to the above embodiments, wherein
the vehicle body frame includes a first portion (for example 61, 91) that supports the electric motor and the battery, and a second portion (for example 62, 92) that supports the engine, and
the second portion is connected to the first portion in a state where an inclination is suppressed by an inclination suppression mechanism (for example 63, 93) that suppresses an inclination of the engine.

According to this embodiment, since the inclination of the engine can be suppressed, it is possible to prevent seizure of the engine and the like even when the truck is inclined as a whole.

11. According to the above embodiments, wherein
the engine is provided with an engine stop mechanism (for example 2b) that stops drive of the engine when an inclination of the engine exceeds a predetermined threshold.

According to this embodiment, even when the inclination of the engine cannot be suppressed by the inclination suppression mechanism, the drive of the engine is stopped by the engine stop mechanism, so that it is possible to further prevent seizure of the engine due to insufficient lubrication of the engine oil.

12. According to the above embodiments, wherein
the vehicle body frame includes a mounting portion (for example 15) on which a mounted object is mounted, and
the engine is supported by the vehicle body frame such that an upper end of the engine protrudes upward from an upper end of the mounting portion.

According to this embodiment, since the mounted component mounted on the mounting portion is disposed at a relatively low position in the up-and-down direction, the center of gravity of the vehicle as a whole can be lowered.

13. According to the above embodiments, wherein
autonomous traveling is enabled by an autonomous control unit (for example 500) that is mountable on the truck.

According to this embodiment, a truck capable of autonomously traveling is provided.

The invention is not limited to the foregoing embodiments, and various variations/changes are possible within the spirit of the invention.

What is claimed is:

1. A truck comprising:
an electric motor that generates a traveling drive force;
a battery that supplies power to the electric motor;
an engine that drives a generator capable of charging the battery;
a lock mechanism that is capable of manually switching between a lock state in which the battery is locked with respect to the vehicle body frame and a release state in which the battery is removable from the vehicle body frame; and
a vehicle body frame that supports the engine, the electric motor, and the battery,
wherein the battery is attachable and detachable with respect to the vehicle body frame,
wherein the battery is provided between the electric motor and the engine in a front-and-rear direction of the truck,
wherein the electric motor, the battery and the engine are disposed on a straight line along the front-and-rear direction of the truck in a plan view,
wherein the lock mechanism includes a positioning member and a lever,
wherein the positioning member is provided so as to sandwich the battery in the front-and-rear direction and the vehicle width direction in a state where the battery is mounted on the vehicle body frame,
wherein the lever is used for switching the state of the lock mechanism between the lock state and the release state, and is rotatably provided on the positioning member,
wherein the lever includes a grip portion, a side portion, and a rotating shaft member.

2. The truck according to claim 1, further comprising:
a front wheel and a rear wheel, wherein
the battery is disposed between a drive shaft of the front wheel and a drive shaft of the rear wheel in the front-and-rear direction of the truck.

3. The truck according to claim 2, wherein
the electric motor is disposed so as to at least partially overlap one of the front wheel and the rear wheel in side view of the truck, and
the engine is disposed so as to at least partially overlap the other of the front wheel and the rear wheel different from the one of the front wheel and the rear wheel in side view of the truck.

4. The truck according to claim 2, wherein
the front wheel is driven by at least the electric motor, and
the rear wheel is driven by the front wheel, and
the engine is provided behind the battery in the front-and-rear direction of the truck.

5. The truck according to claim 2, further comprising:
a control unit that controls at least the electric motor, wherein
the control unit is disposed between the electric motor and the battery in the front-and-rear direction of the truck.

6. The truck according to claim 1, wherein
the battery is attachable and detachable in an up-and-down direction with respect to the vehicle body frame.

7. The truck according to claim 1, wherein
a plurality of batteries are provided, and
the plurality of batteries are disposed side by side in a vehicle width direction.

8. The truck according to claim 6, wherein
the vehicle body frame includes a first portion that supports the electric motor and the battery, and a second portion that supports the engine, and
the second portion is connected to the first portion in a state where an inclination is suppressed by an inclination suppression mechanism that suppresses an inclination of the engine.

9. The truck according to claim 8, wherein
the engine is provided with an engine stop mechanism that stops drive of the engine when an inclination of the engine exceeds a predetermined threshold.

10. The truck according to claim 1, wherein
the vehicle body frame includes a mounting portion on which a mounted object is mounted, and
the engine is supported by the vehicle body frame such that an upper end of the engine protrudes upward from an upper end of the mounting portion.

11. The truck according to claim 1, wherein autonomous traveling is enabled by an autonomous control unit that is mountable on the truck.

12. A truck comprising:
an electric motor that generates a traveling drive force;
a battery that supplies power to the electric motor;
an engine that drives a generator capable of charging the battery;
a lock mechanism that is capable of manually switching between a lock state in which the battery is locked with respect to the vehicle body frame and a release state in which the battery is removable from the vehicle body frame; and
a vehicle body frame that supports the engine, the electric motor, and the battery,
wherein the battery is attachable and detachable with respect to the vehicle body frame,
wherein the battery is provided between the electric motor and the engine in a front-and-rear direction of the truck,
wherein the electric motor, the battery and the engine are disposed on a straight line along the front-and-rear direction of the truck in a plan view,
wherein the lock mechanism includes a lever and a regulation member,
wherein the lever is used for switching the state of the lock mechanism between the lock state and the release state, and is rotatably provided on the positioning member,
wherein the regulation member is a member capable of regulating movement of the battery in an up-and-down direction, and is displaced between a lock position for regulating movement of the battery in the up-and-down direction and a release position for releasing regulation by rotation of the lever,
wherein the regulation member includes an inclined portion that abuts on the side portion of the lever.

13. The truck according to claim 12, wherein, when the lever rotates from the release state to the lock state, the side portion rotates while abutting on the inclined portion of the regulation member, so that the regulation member is displaced inward in a vehicle width direction of the truck.

14. The truck according to claim 12, wherein the regulation member is provided so as to be biased to an outside in a vehicle width direction of the truck.

* * * * *